United States Patent [19]

Tanaka et al.

[11] Patent Number: 4,964,048

[45] Date of Patent: Oct. 16, 1990

[54] SYSTEM AND METHOD FOR AUTOMATICALLY CONTROLLING VEHICLE SPEED TO DESIRED CRUISE SPEED

[75] Inventors: Hiroshi Tanaka; Yohsiyuki Etoh; Yasuhisa Takeuchi, all of Kanagawa, Japan

[73] Assignee: Nissan Motor Company, Limited, Japan

[21] Appl. No.: 263,387

[22] Filed: Oct. 27, 1988

[30] Foreign Application Priority Data

Oct. 30, 1987 [JP] Japan .......................... 62-165384[U]
Oct. 30, 1987 [JP] Japan .......................... 62-165385[U]

[51] Int. Cl.⁵ .............................................. B60K 31/00
[52] U.S. Cl. .............................. 364/426.04; 180/179; 123/352
[58] Field of Search ................... 364/426.04; 324/161; 180/170, 179; 123/352

[56] References Cited

U.S. PATENT DOCUMENTS

| | | | |
|---|---|---|---|
| 4,434,469 | 2/1984 | Suzuki et al. | 364/426.04 |
| 4,479,184 | 10/1984 | Nakano | 364/426.04 |
| 4,484,279 | 11/1984 | Muto | 364/426.04 |
| 4,539,642 | 9/1985 | Mizuno et al. | 364/426.04 |
| 4,540,060 | 9/1985 | Kawata et al. | 180/179 |
| 4,553,621 | 11/1985 | Hyodo et al. | 180/179 |
| 4,646,861 | 3/1987 | Kawata et al. | 180/176 |
| 4,797,826 | 1/1989 | Onogi et al. | 364/426.04 |

Primary Examiner—Thomas G. Black
Attorney, Agent, or Firm—Lowe, Price, Leblanc, Becker & Shur

[57] ABSTRACT

A system and method for automatically controlling a vehicle speed to a desired cruise speed are disclosed in which when at least one of conditions that any one of command signals from corresponding operation command switches is outputted and that a microcomputer of the automatic cruise speed controlling system normally operates and outputs control command signals indicating that corresponding one of control valves is energized is satisfied, the power supply to the control valves is enabled. On the contrary, when at least one of conditions that none of the command signals from the corresponding command switches is outputted and that the microcomputer erroneously outputs control command signals indicating that the corresponding one of the control valves is energized is satisfied, the power supply to the control valves is disabled. The control valves cause air pressure in a chamber defined by a diaphragm to be adjusted, the diaphragm being linked to an engine throttle valve, so that an opening angle of the throttle valve is adjusted to control the vehicle speed.

18 Claims, 2 Drawing Sheets

SYSTEM AND METHOD FOR AUTOMATICALLY CONTROLLING VEHICLE SPEED TO DESIRED CRUISE SPEED

BACKGROUND OF THE INVENTION

1. Field of the Invention

The present invention relates to a system and method for automatically controlling a vehicle speed to a desired cruise speed with countermeasures against erroneous operations of control circuits and power savings.

2. Background of the Art

Various types of systems and method for automatically controlling a vehicle speed to a desired cruise speed have been proposed, which can cruise the vehicle at the desired cruise speed without operation of accelerator pedals.

Such previously proposed automatic cruise speed controlling systems are exemplified by U.S. patent applications Ser. No. 055,516 now U.S. Pat. No. 835,696, filed on May 29, 1987, Ser. No. 057,086 now U.S. Pat. No. 829,438, filed on June 3, 1987, Ser. No. 061,295 now U.S. Pat. No. 4,870,584, filed on June 12, 1987, Ser. No. 109,031 now U.S. Pat. No. 4,845,622, filed on Oct 16, 1987, Ser. No. 130,473, now U.S. Pat. No. 4,922,428, filed on Dec. 9, 1987, Ser. No. 143,092 filed on Jan. 12, 1988, Ser. No. 146,558, now U.S. Pat. No. 4,908,764, filed on Jan. 21, 1988, and Ser. No. 169,218 now U.S. Pat. No. 4,914,595, filed on Mar. 16, 1988.

SUMMARY OF THE INVENTION

It is an object of the present invention to provide an improved system and method for automatically controlling a vehicle speed to a desired cruise speed which can appropriately, economically, and more reliably execute vehicle speed controls on cruise run of vehicles.

The above-described object can be achieved by providing a system for a vehicle, comprising: (a) first means for detecting a current vehicle speed; (b) second means having a first command switch through which the current vehicle speed is set as a cruise speed at which the vehicle is desired to cruise and which outputs a first command signal to command the contents thereof, a second command switch through which the current cruise speed set through the first command switch is increased at a constant change rate of the vehicle speed to another cruise speed at which the vehicle is desired to cruise and which outputs a second command signal to command the contents thereof, and a third command switch through which the current vehicle speed is again returned to the original cruise speed before a system operation is released and which outputs a third command signal to command the contents thereof; (c) third means responsive to any one of the first, second, and third command signals for outputting a control command signal through each of a plurality of output ports thereof according to the corresponding one of the first, second, and third command signals; (d) fourth means having a plurality of control valves for, with a power supply therefor being received, adjusting an operating variable of a vehicular engine driving force adjusting mechanism according to the contents of the control command signals outputted from the third means via the respective output ports so that the current vehicle speed is controlled according to the corresponding one of the contents of the first, second, and third command signals; and (e) fifth means for detecting at least one of conditions that any one of the first, second, and third command signals is outputted from the corresponding first, second, and third command switches of the second means to the third means and that the third means normally outputs each of the control command signals indicating that the corresponding one of the control valves is energized and enabling the power supply for the control valves when detecting at least one of the conditions.

The above-described object can also be achieved by a system for a vehicle, comprising: (a) first means for detecting a current vehicle speed; (b) second means through which the current vehicle speed is set as a cruise speed at which the vehicle is desired to cruise and which outputs a first command signal to command the contents thereof; (c) third means through which the current cruise speed set through the second means is increased at a constant change rate to another cruise speed at which the vehicle is desired to cruise and which outputs a second command signal to command the contents thereof; (d) fourth means through which the current vehicle speed is again returned to the original cruise speed before a system operation is released and which outputs a third command signal to command the contents thereof; (e) fifth means responsive to any one of the first, second, and third command signals for outputting a control command signal through each of a plurality of output ports thereof according to any one of the first, second, and third command signals; (f) sixth means having a plurality of control valves for, with a power supply therefor being received, adjusting an operating variable of a vehicular engine driving force adjusting mechanism according to the contents of the control command signals outputted from the fifth means via the respective output ports so that the current vehicle speed is controlled according to the corresponding one of the contents of the first, second, and third command switches; and (g) seventh means for detecting at least one of conditions that any one of the first, second, and third command signals is derived from the corresponding second, third, and fourth means and that the fifth means normally outputs one of the control command signals indicating that the corresponding one of the control valves is energized and enabling the power supply for the control valves when detecting at least one of the conditions.

The above-described object can also be achieved by a system for a vehicle, comprising: (a) first means for detecting a current vehicle speed; (b) second means having a first command switch through which the current vehicle speed is set as a cruise speed at which the vehicle is desired to cruise and which outputs a first command signal to command the contents thereof, a second command switch through which the current cruise speed set through the first command switch is increased at a constant change rate of the vehicle speed to another cruise speed at which the vehicle is desired to cruise and which outputs a second command signal to command the contents thereof, and a third command switch through which the current vehicle speed is again returned to the original cruise speed before s system operation is released and which outputs a third command signal to command the contents thereof; (c) third means responsive to any one of the first, second, and third command signals for outputting a control command signal through each of a plurality of output ports thereof according to the corresponding one of the first, second, and third command signals; (d) fourth means having a plurality of control valves for, with a power supply therefor being received, adjusting an operating variable of a vehicular engine driving force adjusting mechanism according to the contents of the control command signals outputted from the third means via the respective output ports so that the current vehicle speed is controlled according to the corresponding one of the contents of the first, second, and third command signals; (e) fifth means for detecting at least one of conditions that none of the first, second, and third command signals is outputted from the corresponding first, second, and third command switches of the second means to the third means and that the third means erroneously outputs one of the control command signals indicating that the corresponding one of the control valves is energized and disabling the power supply for the control valves when detecting at least one of the conditions.

The above-described object can also be achieved by providing a system for a vehicle, comprising: (a) first means for detecting a current vehicle speed; (b) second means having a first command switch through which the current vehicle speed is set as a cruise speed at which the vehicle is desired to cruise and which outputs a first command signal to command the contents thereof, a second command switch through which the current cruise speed set through the first command switch is increased at a constant change rate of the vehicle speed to another cruise speed at which the vehicle is desired to cruise and which outputs a second command signal to command the contents thereof, and a third command switch through which the current vehicle speed is again returned to the original cruise speed before a system operation is released and which outputs a third command signal to command the contents thereof; (c) third means responsive to any one of the first, second, and third command signals for outputting a control command signal through each of a plurality of output ports thereof according to the corresponding one of the first, second, and third command signals; (d) fourth means having a plurality of control valves for, with a power supply therefor being received, adjusting an operating variable of a vehicular engine driving force adjusting mechanism according to the contents of the control command signals outputted from the third means via the respective output ports so that the current vehicle speed is controlled according to the corresponding one of the first, second, and third command signals; and (e) fifth means for detecting a condition that none of the first, second, and third command signals is outputted from the corresponding first, second, and third command switches of the second means to the third means and disabling the power supply for the control valves when detecting the condition.

The above-described object can also be achieved by providing a method for automatically controlling a vehicle speed to a desired cruise speed, comprising the steps of: (a) detecting a current vehicle speed; (b) providing second means having a first command switch through which the current vehicle speed is set as a cruise speed at which the vehicle is desired to cruise and which outputs a first command signal, a second command switch through which the current cruise speed set through the first command switch is increased at a constant change rate of the vehicle speed to another cruise speed at which the vehicle is desired to cruise and which outputs a second command signal to command the contents thereof, and a third command switch through which the current vehicle speed is again returned to the original cruise speed before a system operation is released and which outputs a third command signal to command the contents thereof; (c) providing third means responsive to any one of the first, second, and third command signals for outputting a control command signal through each of a plurality of output ports thereof according to the corresponding one of the first, second, and third command signals; (d) providing fourth means having a plurality of control valves for, with a power supply therefor being received, adjusting an operating variable of a vehicular engine driving force adjusting mechanism according to the contents of the control command signals outputted from the third means via the respective output ports so that the current vehicle speed is controlled according to the corresponding one of the contents of the first, second, and third command signals; (e) detecting at least one of conditions that none of the first, second, and third command signals is outputted from the corresponding first, second, and third switches of the second means to the third means and that the third means erroneously outputs one of the control command signals indicating that the corresponding one of the control valves is energized; and (f) disabling the power supply for the control valves when detecting at least one of the conditions in the step (e).

DETAILED DESCRIPTION OF THE PREFERRED EMBODIMENTS

Reference will hereinafter be made to the drawings in order to facilitate understanding of the present invention.

Figure 1:
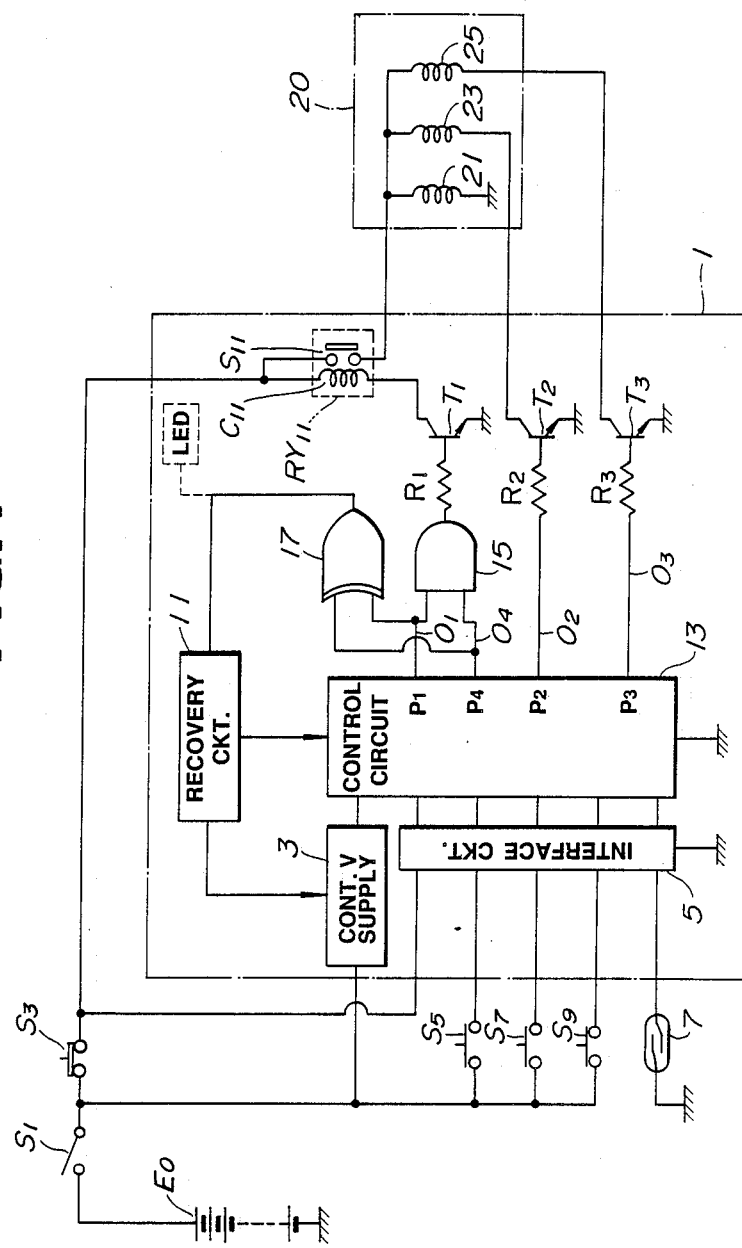
FIG. 1 is a schematic circuit block diagram of a system for automatically controlling a vehicle speed to a desired cruise speed according to the present invention.

FIG. 1 shows one preferred embodiment of system for automatically controlling a vehicle speed to a desired cruise speed.

As shown in FIG. 1, a positive electrode of a vehicle battery $E_o$ is connected to one end of a main switch $S_1$ of a normally open type. The other end of the main switch $S_1$ (ignition switch) is connected to a constant voltage supply circuit 3 of a control unit 1 and to one end of each of set/cruise switch $S_5$, acceleration switch $S_7$, and resume switch $S_9$. The other ends of these switches $S_5$, $S_7$, and $S_9$ are respectively connected to an interface circuit 5. In addition, a vehicle speed sensor 7 is connected to the interface circuit 5 for producing and outputting an information on the vehicle speed to the interface circuit 5. The other end of the main switch $S_1$ is connected to one end of a brake switch $S_3$ of a normally closed type. The brake switch $S_3$ is turned off (open) when a brake pedal is depressed. The other end of the brake switch $S_3$ is connected to the interface circuit 5 and a relay $RY_{11}$.

The control unit generally denoted by 1 includes the constant voltage supply circuit 3 which supplies a predetermined DC voltage to each related circuit upon receipt of the voltage supply from the battery $E_o$ via the main switch $S_1$. In addition, the constant voltage supply circuit 3 is connected to a recovery circuit 11 via a signal line for halting the power supply to each circuit such as a control circuit 12 by operating switching means incorporated therein. The control circuit 13 comprises a microcomputer 13 to execute various control processings on a cruise run, a plurality of output ports each for outputting a control command (control command signal) set on the basis of the result of the above-described control processings, and a memory for storing information on the cruise run. The control circuit 13 receives each information derived via the interface circuit 5 which provides means for converting signal levels and outputs each kind of control commands sequentially for each control period.

The contents of control commands derived via output ports $P_1$, $P_2$, and $P_3$ of the control circuit 13 are as follows.

When an actual vehicle speed $V_1$ derived from the vehicle speed sensor 7 is below a stored vehicle speed $V_o$, the control circuit 13 outputs high-level control commands via the output ports $P_1$, $P_2$, and $P_3$, respectively. Therefore, release valve 21, supply valve 23, and air valve 25 are operated to adjust an opening angle of a vehicular engine throttle valve (not shown) in an open direction, thus the vehicle speed being increased. It is noted that the stored vehicle speed $V_o$ is derived by setting the current vehicle speed to cruise through, e.g., the set/cruise switch $S_5$.

When the actual vehicle speed $V_1$ is equal to the stored vehicle speed $V_o$ stored in the memory, the control circuit 13 outputs high-level signals via the output ports $P_1$ and $P_3$ and outputs a low-level control command via the output port $P_2$. Therefore, a release (safety valve) valve 21 and air valve 25 which normally open to supply the atomspheric pressure in a chamber defined by a diaphragm linked to an engine throttle valve via a wire (not shown) are operated and the air supply valve 23 is turned off (deenergized) so that an opening angle of the engine throttle valve (not shown) remains constant to maintain the actual vehicle speed at the stored cruise speed $V_o$.

Next, when the actual vehicle speed $V_1$ is above the stored vehicle speed $V_o$, the control circuit 13 outputs the high-level control command from the output port $P_1$ and outputs the low-level control commands via the output ports $P_2$ and $P_3$. Therefore, only the release valve 21 is turned on (energized) and supply valve 23 and air valve 25 are turned off so that the opening angle of the throttle valve is adjusted in the close direction and thus the vehicle speed is reduced.

If the brake pedal is depressed and the brake switch $S_3$ is turned off (open), the low-level control commands are outputted via the output ports $P_1$, $P_2$, and $P_3$. Thus, the whole operation of the actuator 20 is inhibited (since all transistors $T_1$ to $T_3$ are not conducted) and the cruise run state by the system is temporarily halted (released).

During the run after the temporary release of the cruise run described above, when the resume switch $S_9$ is operated, the vehicle speed is returned to the stored vehicle speed $V_o$.

On the other hand, if the acceleration switch $S_7$ is operated during the cruise run at the stored cruise speed $V_o$, a value of the stored vehicle speed $V_o$ is incremented by a constant rate and the stored cruise speed is sequentially increased to another cruise speed.

As described above, the output port $P_1$ provides the control command $0_1$ indicating a command to actuate the relay $RY_{11}$ to supply power to the actuator 20. The contents of the control command (signal) $0_1$ may be outputted in a form of a single bit, or a plurality of serial bits, e.g., four bits, or eight bits, or alternatively an appropriate signal form of parallel bits.

In the above-described preferred embodiment shown in FIG. 1, one control command $0_4$ is outputted from another output port $P_4$ which has the same timing as the control command $0_1$ and has the same signal form provided that the microcomputer constituting the control circuit 13 executes a set of program routines normally.

Output means for outputting the control command $0_4$ may have the same construction as the means for outputting the control command $0_1$ or may be constituted by a logic construction which is different from the control command $0_1$ outputting means, e.g., a program of another routine than a set program to set the control command $0_1$ so that a system reliability can more remarkably be increased.

Specifically, when the control command $0_1$ is formed of a single bit, the control command $0_4$ may be constituted by a signal such that when the set/cruise switch $S_5$ is turned on and off to transfer the operation state from a non-cruise control state into the cruise speed control state, the high-level signal is provided and when the brake switch $S_3$ is open, the low-level signal is provided.

The output port $P_1$ of the control circuit 13 is connected to one input terminal of an AND circuit 15 and an Exclusive-OR circuit 17 and the output port P is connected to each other terminal of the AND gate 15 and Exclusive-OR circuit 17. The output end of AND gate 15 is connected to a base of a transistor $T_1$ via a resistor $R_1$. Hence, the high-level signal is supplied to the base of the transistor $T_1$ only when both control commands $0_1$ and $0_4$ are at high levels.

In addition, the output end of the Exclusive-OR circuit 17 is supplied to the recovery circuit 11 for outputting the high-level signal to the recovery circuit 11 only when both signal levels of the control commands $0_1$ and $0_4$ are mutually different. When the high-level signal is received from the Exclusive-OR circuit 17, the recovery circuit 11 outputs an interrupt command representing the interruption of power supply to the constant voltage supply circuit 3 and control circuit 13. It is noted that the output port $P_2$ is connected to a base of a transistor $T_2$ via a resistor $R_2$ and the output port $P_2$ is connected to a base of a transistor $T_3$ via a resistor $R_3$.

The relay $RY_{11}$ includes a coil $C_{11}$ and contacts $S_{11}$, one contact $S_{11}$ being connected to one end of the coil $C_{11}$ and to the other end of the brake switch $S_3$, the other contact $S_{11}$ being connected to the actuator 20, and the other end of the coil $C_{11}$ being connected to a collector of the transistor $T_1$. Each emitter of the transistors $T_1$ to $T_3$ is grounded. When the transistor $T_1$ is conducted, the coil $C_{11}$ receives an energization current so that the contacts $S_{11}$ are closed to supply the power to the actuator 20. One end of the release valve 21 is grounded. The ends of the air valve and air supply valve 23 and 25 are connected to collectors of transistors $T_2$ and $T_3$, respectively.

For example, when the low-level control command $0_4$ is outputted from the output port $P_4$ with the high-level control command $0_1$ outputted from the output port $P_1$ during the cruise control operation, the AND circuit 15 outputs the low-level signal to turn off the transistor $T_1$. At this time, the relay $RY_{11}$ is recovered to open its contacts $S_{11}$ so that the power supply to the actuator 20 is interrupted. Since both levels of the control commands $0_1$ and $0_4$ are mutually different, the high-level signal is supplied from the Exclusive-OR circuit 17 to the recovery circuit 11. The recovery circuit 11 outputs the interrupt command to the constant voltage supply circuit 3 so that the constant voltage supply is halted to each circuit connected thereto. Hence, both the control circuit 13 and actuator 20 receives no power supply so that the cruise speed running state generated by means of the system is completely inhibited.

Although, in the preferred embodiment shown in FIG. 1, the control commands to interrupt the power supply are independently outputted from the plurality of output ports $P_1$ and $P_4$, respectively, as control commands to execute specific controls on the cruise run from the controlling means such as the microcomputer, appropriate control commands may respectively independently be outputted from two or more output ports and the power supply to the controlling means (control circuit 13) is interrupted in a case when the signals outputted from these output ports are respectively different. In this case, the reliability of the system can be improved.

In addition, display means such as lamp or LED (light emitting diode) shown in FIG. 1 may be provided and illuminated on the basis of the output of the Exclusive-OR circuit 17 in a case when the output signals from the output ports $P^1$ and $P^4$ of the control circuit 13 are mutually different.

Figure 2:
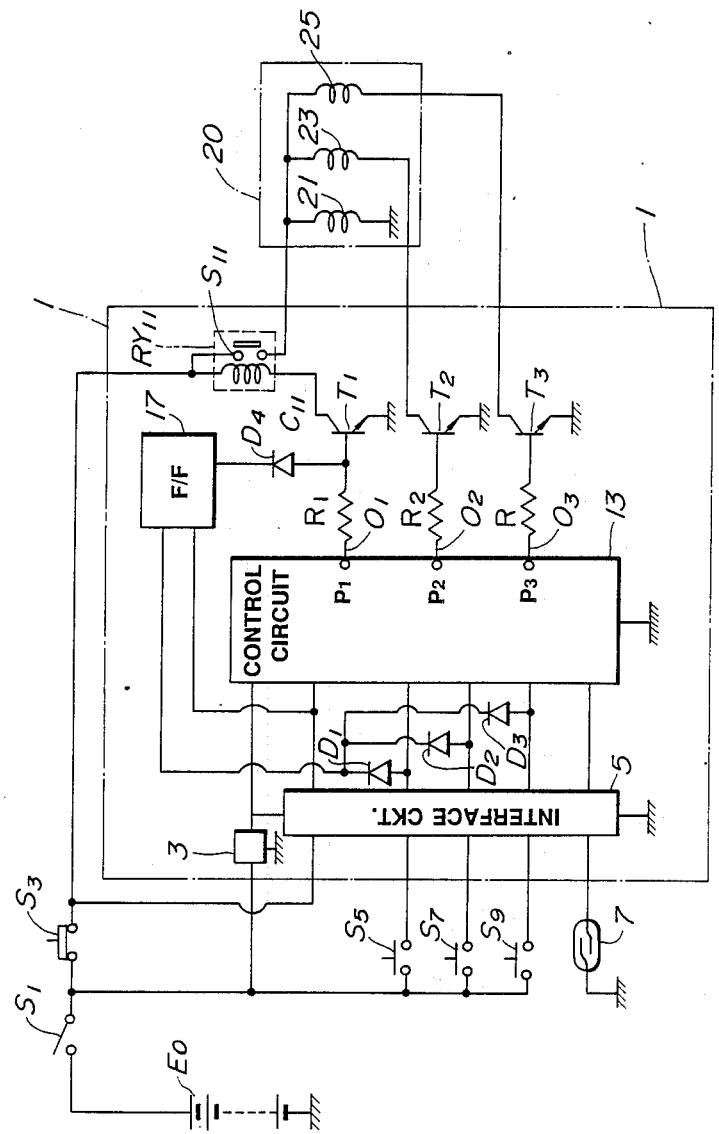
FIG. 2 is a schematic circuit block diagram of another system for automatically controlling a vehicle speed to a desired cruise speed.

FIG. 2 shows another preferred embodiment of the automatic cruise speed controlling system according to the present invention.

In FIG. 2, the same reference numerals designate corresponding elements shown in FIG. 1.

However, numeral 17 shown in FIG. 2 denotes a flip-flop (F/F) circuit, specifically a Reset/Set flip-flop circuit of a set priority type.

As shown in FIG. 2, the output port $P_1$ is connected to an anode of a diode $D_4$ via the resistor $R_1$ and to the base of the transistor $T_1$. A cathode of the diode $D_4$ is connected to an output end (Q) of the flip-flop circuit 17. A reset terminal of the flip-flop circuit 17 receives the temporary release signal, e.g., the release signal indicating that the brake switch $S_3$ is open (or clutch switch connected in series with the brake switch is open when a clutch pedal is depressed) from the brake switch $S_3$ (or clutch switch) via the interface circuit 5.

On the other hand, a set terminal of the flip-flop circuit 17 is connected to each cathode of diodes $D_1$ to $D_3$. It is noted that an anode of the diode $D_1$ is connected to the set/cruise switch $S_5$ via the interface circuit 5, the anode of the diode $D_2$ is connected to the acceleration switch $S_7$ via the interface circuit 5, and the anode of the diode $D_3$ is connected to the resume switch $S_9$ via the interface circuit 5.

As shown in FIG. 2, when any one of the set/cruise, acceleration, and resume switches $S_5$, $S_7$, and $S_9$ is turned on and off (operated), the high-level signal is outputted to the set terminal of the flip-flop circuit 17 as well as the interface circuit 5. In addition, when the brake switch $S_3$ or clutch switch is open, the high-level signal is outputted to the reset terminal of the flip-flop circuit 17. A clock terminal of the flip-flop circuit 17 receives a clock pulse having a predetermined period from a clock pulse generator. The flip-flop circuit 17 is operated in synchronization with the clock pulse period.

That is to say, if the high-level signal is inputted to the set terminal of the flip-flop circuit 17, the output level thereof is inverted in synchronization with the subsequently inputted clock pulse, and the high-level signal is outputted from the output port thereof, and its output state is held.

If, in this state, the high-level signal is supplied to the reset terminal thereof, the output level is recovered in synchronization with the subsequently inputted clock pulse, the low-level signal is outputted from the output end thereof, and such recovery state is maintained. In addition, immediately after the power supply of the control unit 1 is turned on, the above-described recovery state is held.

Hence, only when the operation command from the operation portion (any one of the set/cruise switch, acceleration switch, and resume switch $S_5$, $S_7$, and $S_9$ is operated) is issued, the power supply to the actuator 20 (which serves as the vehicle speed setting means) is enabled by the flip-flop circuit 17.

When the set/cruise switch $S_5$ is operated during the run at, e.g., 60 Km/h, the high-level signal is outputted to the set terminal of the F/F circuit 17 via the diode $D_1$. When the set terminal of the F/F circuit 17, the level of the output signal is inverted and indicates the high level. Thus, the transistor $T_1$ is enabled to permit the power supply to the actuator 20.

Hence, the control circuit 13 stores the vehicle speed $V_o$ when the set/cruise switch $S_5$ is operated, executes the cruise control on the basis of the stored vehicle speed $V_o$, and outputs the high-level control command $0_1$ from the output port $P_1$ thereof. Therefore, the transistor $T_1$ is turned on, the coil $C_{11}$ of the relay $RY_{11}$ is energized to close the contacts $S_{11}$. Consequently, the actuator 20 receives the power supply from the battery $E_o$ via the main switch $S_1$ and brake switch $S_3$.

In addition, the control circuit 13 controls the supply valve 23 and air valve 25 of the actuator 20 on the basis of the control commands from the output ports $P_2$ and $P_3$ thereof so that the vehicle can cruise at the stored cruise speed $V_o$ i.e., 60 Km/h.

On the other hand, when the brake pedal is depressed and the brake switch $S_3$ is open, the interface circuit 5 detects that the brake switch $S_3$ is open and outputs the high-level signal to the reset terminal of the F/F circuit 17. The flip-flop circuit 17 then recovers in synchronization with the subsequently inputted clock pulse and outputs the low-level signal from the output end thereof. Therefore, the transistor $T_1$ cannot be turned on to interrupt the power supply to the actuator 20.

When the control circuit 13 determines that the brake switch $S_3$ is open, the output port $P_1$ thereof provides the low-level signal. Thus, the transistor $T_1$ is turned off and the relay $RY_{11}$ is recovered to open the contacts $S_{11}$ so that the power supply to the actuator 20 is disabled. Hence, the temporary interruption of the power supply is carried out.

When the temporary interruption of power supply is carried out during the cruise run, the output end of the flip-flop circuit 17 is set at the low level. At this time, if the high level signal is outputted from the output port $P_1$ of the control circuit 13, the high level signal from the output port $T_1$ is sucked into the output end of the flip-flop circuit 17 via the resistor $R_1$ and diode $D_4$. Since at this time a forward voltage drop $V_F$ of the diode $D_4$ is set as a value smaller than a base-emitter voltage $V_{BE}$ to turn on the transistor ($V_F < V_{BE}$), the transistor $T_1$ is not conducted. Hence, when the high level signal is outputted from the output port $P_1$ of the control circuit 13 during the temporary interruption of the cruise run by the system, the power supply to the actuator 20 is halted.

Since, in the preferred embodiment shown in FIG. 2, the interface circuit 5 monitors the operation states of the set/cruise switch $S_5$, $S_7$, and $S_9$, the interface circuit 5 can halt the power supply to the actuator 20 together with the operation of the flip-flop circuit 17. The clock pulse generator for the flip-flop circuit 17 may be incorporated in the control circuit 13 or may be provided independently.

It should be noted that the feature in the system in the preferred embodiment shown in FIG. 1 may be combined with the feature in the system in the other preferred embodiment shown in FIG. 2.

That is to say, the diode $D_4$, the R/S flip-flop circuit 17, and the diodes $D_1$ to $D_3$ shown in FIG. 2 may sequentially be connected between the base of the transistor $T_1$ and the interface circuit 5 shown in FIG. 1.

As described hereinabove, the system and method for automatically controlling a vehicle speed to a desired cruise speed according to the present invention, the control for the cruise run of the vehicle can appropriately and reliably be executed according to situations and can save the power consumption.

It will fully be appreciated by those skilled in the art that the foregoing description is made in terms of the preferred embodiments and various changes and modifications may be made without departing from the scope of the present invention which is to be defined by the appended claims.

What is claimed is:

1. A method for automatically controlling a vehicle speed to a desired cruise speed, comprising the steps of:
   (a) detecting a current vehicle speed;
   (b) providing second means having a first command switch through which the current vehicle speed is set as a cruise speed at which the vehicle is desired to cruise and which outputs a first command signal to command the contents thereof, a second command switch through which the current cruise speed set through the second means is increased at a constant change rate of the vehicle speed to another cruise speed at which the vehicle is desired to cruise and which outputs a second command signal to command the contents thereof, and a third command switch through which the current vehicle speed is again returned to the original cruise speed before a system operation is released and which outputs a third command signal to command the contents thereof;
   (c) providing third means responsive to any one of the first, second, and third command signals for outputting a control command signal through each of a plurality of output ports thereof according to the corresponding one of the first, second, and third command signals;
   (d) providing fourth means having a plurality of control valves for, with a power supply therefor being received, adjusting an operating variable of a vehicular engine driving force adjusting mechanism according to the contents of the control command signals outputted from the third means via the respective output ports so that the current vehicle speed is controlled according to the corresponding one of the contents of the first, second, and third command signals;
   (e) detecting at least one of conditions that none of the first, second, and third command signals is outputted from the corresponding first, second, and third command switches of the second means to the third means and that the third means erroneously outputs one of the control command signals indicating that the corresponding one of the control valves is energized; and
   (f) disabling the power being supplied to the control valves when detecting at least one of the conditions in the step (e).

2. A system for a vehicle, comprising:
   (a) first means for detecting a current vehicle speed;
   (b) second means through which the current vehicle speed is set as a cruise speed at which the vehicle is desired to cruise and which outputs a first command signal to command the contents thereof;
   (c) third means through which the current cruise speed set through the second means is increased at a constant change rate to another cruise speed at which the vehicle is desired to cruise and which outputs a second command signal to command the contents thereof;
   (d) fourth means through which the current vehicle speed is again returned to the original cruise speed before a system operation is released and which outputs a third command signal to command the contents thereof;
   (e) fifth means responsive to any one of the first, second, and third command signals for outputting a control command signal through each of a plurality of output ports thereof according to the corresponding one of the first, second, and third command signals;
   (f) sixth means having a plurality of control valves for, with a power supply therefor being received, adjusting an operating variable of a vehicular engine driving force adjusting mechanism according to the contents of the control command signals outputted from the fifth means via the respective output ports so that the current vehicle speed is controlled according to the corresponding one of the contents of the first, second, and third command signals derived from the second means;
   (g) seventh means for detecting at least one of conditions that any one of the first, second, and third second, third, and fourth means and that the fifth means normally outputs one of the control command signals indicating that the corresponding one of the control valves is energized and enabling the power to be supplied to the control valves when detecting at least one of the conditions.

3. A system as set forth in claim 2, wherein the fifth means comprises a microcomputer having a plurality of output ports and wherein a first output port is set as another one of the plurality of the output ports for providing the same contents of the control command signal as that of a second one of the plurality of the output ports when no erroneous operation is carried out in the microcomputer and the system further comprises a power supply circuit connected between a power supply and the sixth means for operatively supplying the power of the power supply to the sixth means and wherein the seventh means comprises a logic AND gate for receiving both control command signals from the first and second output ports and passing the control command signal from the second output port to the power supply circuit, the contents of the control command passed through the AND gate from the second output port indicating that the corresponding one of the control valves is energized.

4. A system as set forth in claim 3, which further comprises an Exclusive-OR gate for receiving both control command signals from the first and second output ports and for outputting a power interrupt command signal when both contents of the control command signals from the first and second output ports do not coincide with each other and a recovery circuit responsive to the power interrupt signal from the Exclusive-OR gate for resetting the microcomputer upon the receipt of the power interrupt command signal from the Exclusive-OR gate, and a constant voltage supply circuit for providing a constant voltage to a bias supply part of the microcomputer, the recovery circuit outputting a signal to the constant voltage supply circuit to halt the constant voltage supply from the constant voltage supply to the bias supply part of the microcomputer.

5. A system as set forth in claim 4, which further comprises alarm means for producing an alarm upon receipt of the signal from the Exclusive-OR gate.

6. A system as set forth in claim 4, wherein the power supply circuit for the sixth means comprises a resistor connected to an output port of the AND gate, a transistor whose base is connected via the resistor to the output port of the AND gate and whose emitter is grounded, and a power supply relay having a coil one end thereof connected to the power supply via a normally closed brake switch and the other end thereof connected to a collector of the transistor and a contact one end thereof connected to the one end of the coil and the other end thereof connected to each one end of the control valves of the sixth means.

7. A system as set forth in claim 6, wherein the control valves of the sixth means includes a release valve which is normally open and for closing a chamber defined by a diaphragm linked to an engine throttle valve via an accelerator wire when the second control command signal indicating the release valve is energized is received from the transistor via the AND gate and the power supply for the control valves is received, air pressure supply valve which is normally closed and for opening the chamber to supply the air pressure to the chamber so that an opening angle of the throttle valve is directed to an open direction to increase the vehicle speed when receiving the control command signal indicating that the air pressure supply valve is energized from the corresponding output port of the microcomputer via another transistor and another resistor and receiving the power supply via the power supply relay, and an air valve which is normally open to supply the atomspheric pressure to the chamber to decrease the vehicle speed via the engine throttle valve and for closing the chamber when receiving the control command signal from the corresponding output port of the microcomputer indicating that the air valve is energized and that power is being supplied from the power supply via the power supply relay.

8. A system as set forth in claim 7, wherein the control command signal is formed of a single bit, the bit "1" indicating that the corresponding control valve is energized.

9. A system as set forth in claim 7, wherein the first output port and second output port are set through the same program routine executed by the microcomputer.

10. A system as set forth in claim 7, wherein the first output port and second output port are set through different program routines executed by the microcomputer.

11. A system as set forth in claim 10, wherein the first output port provides the control command signal having a bit "1" when the first command signal from the second means is outputted to the fifth means and having a bit "0" when the brake switch is open.

12. A system as set forth in claim 7, wherein the control command signal outputted from each output port comprises a plurality of parallel or serial bits.

13. A system as set forth in claim 2, wherein the second, third, and fourth means comprise a first switch, second switch, and third switch, one end of each switch being connected to a power supply via an ignition switch of the vehicle and the other end of each switch being connected to an interface circuit constituting the fifth means, wherein the fifth means further comprises a microcomputer having the plurality of output ports through which the control command signals are outputted to the sixth means, and wherein the seventh means comprises a Reset/Set flip-flop circuit having a set terminal thereof being connected to each of the other end of the first, second, and third switches via a corresponding diode and the interface circuit, a reset terminal thereof being connected to a normally closed brake switch which open when a brake system of the vehicle is operated via the interface circuit, an output port thereof being connected to one of the output ports of the microcomputer via a diode and a resistor, and a clock terminal thereof being connected to a clock generator, the R/S flip-flop circuit outputting an enable signal to the output port connected to the R/S flip-flop circuit so as to enable the passage of the control command signal indicating that the corresponding control valve is energized to a power supply circuit connected between the power supply and the sixth means when detecting that any one of the first, second, and third command signals is outputted to the interface circuit.

14. A system as set forth in claim 13, wherein the R/S flip-flop circuit outputs a disable signal to the output port connected to the R/S flip-flop circuit so as to disable the passage of the control command signal indicating that the corresponding control valve is energized to the power supply circuit when detecting that the brake switch is open and detecting that neither the first, second, nor third command signal is outputted from any one of the first, second, or third switch to the interface circuit.

15. A system as set forth in claim 14, wherein the power supply circuit includes a transistor whose base receives the control command signal from the corresponding output port of the microcomputer and whose emitter is grounded, a power supply relay having a coil one end thereof connected to the power supply via the ignition switch and brake switch and the other end thereof connected to a collector of the transistor, and a contact, one end thereof connected to the one end of the coil and the other end thereof connected to each one end of the control valves.

16. A system for a vehicle, comprising:
(a) first means for detecting a current vehicle speed;
(b) second means having a first command switch through which the current vehicle speed is set as a cruise speed at which the vehicle is desired to cruise and which outputs a first command signal to command the contents thereof, a second command switch through which the current cruise speed set through the first switch is increased at a constant change rate of the vehicle speed to another cruise speed at which the vehicle is desired to cruise and which outputs a second command signal to command the contents thereof, and a third command switch through which the current vehicle speed is again returned to the original cruise speed before a system operation is released and which outputs a third command signal to command the contents thereof;

(c) third means responsive to any one of the first, second, and third command signals for outputting a control command signal through each of a plurality of output ports thereof according to the corresponding one of the first, second, and third command signals derived from the second means;

(d) fourth means having a plurality of control valves for, with a power supply therefor being received, adjusting an operating variable of a vehicular engine driving force adjusting mechanism according to the contents of the control command signals outputted from the third means via the respective output ports so that the current vehicle speed is controlled according to the corresponding one of the contents of the first, second, and third command signals;

(e) fifth means for detecting at least one of conditions that none of the first, second, and third command signals is outputted from the corresponding first, second, and third command switches of the second means to the third means and that the third means erroneously outputs one of the control command signals indicating that the corresponding one of the control valves is energized and disabling the power being supplied to the control valves when detecting at least one of the conditions.

17. A system for a vehicle, comprising:

(a) first means for detecting a current vehicle speed;

(b) second means having a first command switch through which the current vehicle speed is set as a cruise speed at which the vehicle is desired to cruise and which outputs a first command signal to command the contents thereof, a second command switch through which the current cruise speed set through the second means is increased at a constant change rate of the vehicle speed to another cruise speed at which the vehicle is desired to cruise and which outputs a second command signal to command the contents thereof, and a third command switch through which the current vehicle speed is again returned to the original cruise speed before a system operation is released and which outputs a third command signal to command the contents thereof;

(c) third means responsive to any one of the first, second, and third command signals for outputting a control command signal through each of a plurality of output ports thereof according to any one of the first, second, and third command signals;

(d) fourth means having a plurality of control valves for, with a power supply therefor being received, adjusting an operating variable of a vehicular engine driving force adjusting mechanism according to the contents of the control command signals outputted from the third means via the respective output ports so that the current vehicle speed is controlled according to the corresponding one of the contents of the first, second, and third command signals; and (e) fifth means for detecting a condition that none of the first, second, and third command signals is outputted from the corresponding first, second, and third command switches of the second means to the third means and disabling the power being supplied to the control valves when detecting the condition.

18. A system as set forth in claim 17, wherein the fifth means further detects another condition that the third means erroneously outputs one of the control command signals indicating that the corresponding one of the control valves is energized and disabling the power being supplied to the control valves when detecting both of the conditions.

* * * * *